Patented Feb. 12, 1946

2,394,776

UNITED STATES PATENT OFFICE 2,394,776

MODIFIED POLYMERIC POLYHYDRIC ALCOHOLS

William August Hoffman and Carl Walter Mortenson, Wilmington, Del., assignors to E. I. du Pont de Nemours & Company, Wilmington, Del., a corporation of Delaware No Drawing. Application November 12, 1943,
Serial No. 510,044

14 Claims. (Cl. 260—87)

This invention relates to polymeric organic compounds and more particularly to the modification of polymeric polyhydric alcohols.

Polymeric polyhydric alcohols such as cellulose, polyvinyl alcohol and the like have attained great utility in the arts because of their useful properties. These polymeric polyhydric alcohols suffer, however, from certain disadvantages, particularly with respect to sensitivity towards water and insufficient solubility in organic solvents.

This invention has as an object the provision of new modified polymers. A further object is the improvement of polymeric polyhydric alcohols. Other objects will appear hereinafter.

These objects are accomplished by the following invention of new modified polymeric polyhydric alcohols and their preparation by the reaction of polymeric polyhydric alcohols in the presence of an aqueous solution of an alkaline catalyst with a 2,5-dihydrothiophene-1-dioxide inert to metallic sodium at room temperature, i. e. approximately 25° C.

In general, the modification is effected by heating the polymeric polyhydric alcohol with 2,5-dihydrothiophene-1-dioxide in the presence of an alkaline catalyst. In a preferred modification of the invention, a mixture of 2,5-dihydrothiophene-1-dioxide with a polymeric alcohol in a weight ratio, such that for each equivalent weight of hydroxyl group in the polymeric material there is present preferably at least one mole of 2,5-dihydrothiophene-1-dioxide, is heated with stirring in a vessel at 65°–75° C., preferably under an inert oxygen-free atmosphere. After the contents are thoroughly mixed, about 4% (based on the weight of 2,5-dihydrothiophene-1-dioxide) of sodium or potassium hydroxide dissolved in an equal weight of water is added with vigorous stirring. The reaction is exemplified below for the polyvinyl alcohol reaction.

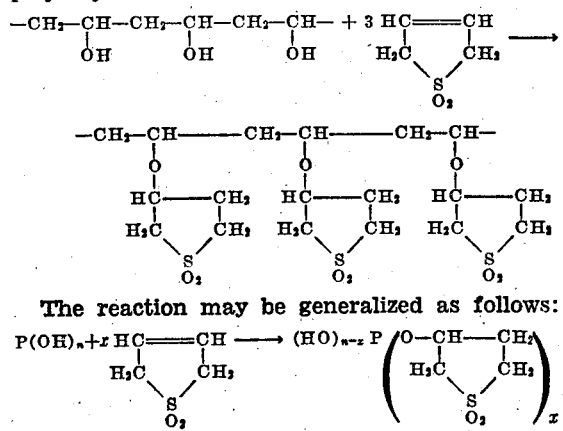

The reaction may be generalized as follows:

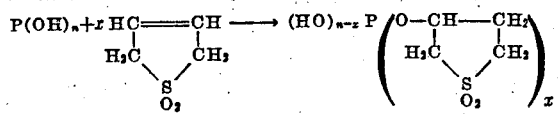

In this P is the non-hydroxyl residue of the polymeric polyhydric alcohol, $n$ the number of hydroxyls in the molecule thereof and $x$ the number of thiophene dioxide molecules entering into reaction with the polymeric polyhydric alcohol.

In the case of polymeric polyhydric alcohols which are initially water soluble, e. g., polyvinyl alcohol, the products usually become progressively less water soluble as the reaction proceeds. The reaction, therefore, can be followed easily by testing the water solubility of samples removed from the reaction vessel. In most cases the reaction is relatively rapid, and usually not more than ½ hour's heating is required to impart water insolubility.

Corresponding ethers of water-insoluble polymeric alcohols (e. g., cellulose) may be prepared by the following procedure: The polymer, shredded and steeped in aqueous alkali, is filtered or pressed as dry as possible and then added with vigorous stirring to 2,5-dihydrothiophene-1-dioxide heated to 65°–75° C. The reaction is usually much slower than with water-soluble polymers and generally heating must be continued for a longer period to bring about a substantial degree of reaction.

Although 2,5-dihydrothiophene-1-dioxide itself reacts with water in the presence of alkali, the reaction with a polymeric polyhydric alcohol may, nevertheless, be carried out in aqueous solution providing the thiophene-dioxide is added in several portions. For example, the polymer may be dissolved or dispersed in a minimum amount of water containing 1–10% of alkali (based on the polymer) and then heated to 65°–75° C. with stirring under a substantially oxygen-free atmosphere while the 2,5-dihydrothiophene-1-dioxide is added in several portions.

The more detailed practice of the invention is illustrated by the following examples wherein parts given are by weight. There are, of course, many forms of the invention other than these specific embodiments.

Example I

This example illustrates the preparation of a 1,1-dioxotetrahydrothienyl-3 ether of polyvinyl alcohol in the absence of a solvent.

One-half part of potassium hydroxide is dissolved in one part of water in a reaction vessel equipped with stirrer and nitrogen inlet. To this is added 90 parts of 2,5-dihydrothiophene-1-dioxide (prepared from butadiene and sulfur dioxide as described in German Patent 506,839) and the mixture is stirred and heated at 65°–70° C. When the 2,5-dihydrothiophene-1-dioxide has all melted and the air in the vessel has been displaced with nitrogen, 13.5 parts of medium viscosity polyvinyl alcohol (any commercial grade is satisfactory) is added with stirring. The vessel is heated at 65°–70° C. and stirred for 24 hours. Two hundred parts of water is then added. The water-insoluble, brown, taffy-like material is washed by kneading in water until most of the color is removed. It may be purified further by dissolving in aqueous formic acid or aqueous dioxane and pouring the solution so obtained into a large volume of water with vigorous stirring. The light amber-colored product is soft, plastic, somewhat tacky and rather elastic. It dries to a hard, horny solid which contains 14.38% of sulfur. Clear, hard films can be cast from the solutions of this ether in dioxane/water (90/10) and the solid ether can be molded into strong, rigid bars.

*Example II*

This example illustrates the preparation of a 1,1-dioxotetrahydrothienyl-3 ether of a water-insoluble polymeric alcohol (cellulose).

Fifty-four parts of cotton linters is pulped in 2,000 parts of 18% sodium hydroxide and allowed to stand one hour. It is then drained of excess alkali and pressed to a press ratio of 4:1. This alkali cellulose is then added to 1760 parts of 2,5-dihydrothiophene-1-dioxide heated to 65°–70° C. in a nitrogen-filled vessel equipped with a stirrer. After the mixture has been heated and stirred for 15 hours, 4,000 parts of water is added and the contents stirred for ½ hour. The modified cellulose is collected by filtration and washed several times by slurrying in water until the washings are no longer alkaline and then dried. The product contains 8.7% of sulfur, softens at 280° C. and can be pressed into strong, tough, translucent sheets at 250° C. and 8,000 lbs./sq. in.

*Example III*

This example illustrates the preparation of a 1,1-dioxotetrahydrothienyl-3 ether of a hydrolyzed ethylene/vinyl acetate copolymer. This polymer was prepared as described in Roland Serial No. 446,114, filed June 6, 1942, and Hanford and Roland Serial No. 446,116, filed June 6, 1942.

The process is carried out as described in Example I using 80 parts of hydrolyzed ethylene/vinyl acetate copolymer (of a ratio corresponding to one ethylene residue per 1.2 vinyl alcohol residues), 720 parts of 2,5-dihydrothiophene-1-dioxide, and 20 parts of 50% aqueous potassium hydroxide solution. The product isolated as described in Example I, is an almost white powder, softening at 125–130° C. as compared to 155–160° C. for the original copolymer. It contains 6.4% of sulfur.

*Example IV*

This example illustrates the reaction of wood pulp with 2,5-dihydrothiophene-1-dioxide.

Fifty-four parts of wood pulp is added to 1300 parts of 2,5-dihydrothiophene-1-dioxide, heated at 65°–70° C. and stirred vigorously until well dispersed. The air in the vessel is displaced with nitrogen and 75 parts of 50% aqueous potassium hydroxide is then added. The mixture is heated at 65°–70° C. and stirred for 18 hours, after which the flask is cooled, 2,000 parts of water is added and the insoluble modified cellulose collected by filtration, washed by slurrying repeatedly in water until free of alkali, and finally dried. The product weighs 69 parts, softens at 280° C., and contains 7.6% of sulfur. At a temperature of 250° C. it can be molded into tough, translucent sheets.

*Example V*

This example illustrates the preparation, in aqueous solution, of a 1,1-dioxotetrahydrothienyl-3 ether of a water-soluble polymeric alcohol.

Thirteen hundred and fifty parts of medium viscosity polyvinyl alcohol is dissolved in 1250 parts of water containing 20 parts of potassium hydroxide and heated to 75° C. Eleven hundred and eighty parts of 2,5-dihydrothiophene-1-dioxide is added in several portions with stirring over the course of three hours. The temperature is then raised to 100° C. for two hours, after which the mixture is cooled and acetone run in until the polymer is precipitated. The polymer is washed by kneading in acetone and then dried. It is insoluble in water but soluble in aqueous acetone and contains 9% of sulfur. By using larger proportions of 2,5-dihydrothiophene-1-dioxide, the amount of sulfur contained in the product can be increased, and by reducing the amount of 2,5-dihydrothiophene-1-dioxide, products having as little as 1% sulfur can be prepared. Water solubility is a function of the per cent of sulfur introduced. For example, products containing less than about 6% of sulfur are somewhat soluble in water, whereas those having a higher sulfur content are substantially insoluble in water.

Films of the water-soluble ethers can be cast directly from the reaction mixture. When the water is then evaporated, there is obtained a film, which is much less water sensitive than films of polyvinyl alcohol, more elastic and more rubbery.

The present invention is generic to the reaction, in the presence of an alkaline alkali metal catalyst, of any polymeric polyhydric alcohol with and 2,5-dihydrothiophene-1 dioxide inert to metallic sodium at 25° C. including 2,5-dihydrothiophene-1-dioxide, 3-methyl-2,5-dihydrothiophene-1-dioxide, 2-methyl-2,5-dihydrothiophene-1-dioxide, 3,4-dimethyl-2,5-dihydrothiophene-1-dioxide, 3,4-diphenyl-2,5-dihydrothiophene-1-dioxide, 3 chloro-2,5-dihydrothiophene-1-dioxide, 2-cyano-2,5-dihydrothiophene-1-dioxide, 3-cyano-2,5-dihydrothiophene-1-dioxide, 2-acetoxy-2,5-dihydrothiophene-1-dioxide, 2-methoxy-2,5-dihydrothiophene-1-dioxide, etc. A particularly convenient method of making 2,5-dihydrothiophene-1-dioxides is by the reaction of sulfur dioxide with the appropriate conjugated diene.

Any polymeric polyhydric alcohol may be employed in the process of this invention including materials having a cellulosic nucleus and free hydroxyls, e. g., cellulosic materials such as cellulose, wood pulp, cotton, regenerated cellulose, hemicellulose; cellulose esters such as cellulose nitrate, cellulose acetate, cellulose propionate, cellulose glycolate; cellulose ethers such as ethyl cellulose, benzyl cellulose; at least partially hydrolyzed vinyl ester polymers, including copolymers, such as polymers of vinyl acetate, vinyl propionate, vinyl butyrate, vinyl benzoate, vinyl chloride with vinyl acetate, vinyl acetate with ethylene, vinyl acetate with vinyl thioacetate; starch.

Any alkaline alkali metal catalyst may be employed including alkali metal hydroxides and alkoxides including sodium hydroxide, potassium hydroxide, sodium ethoxide or methoxide and potassium ethoxide or methoxide. Quaternary ammonium compounds may also be employed. Sodium hydroxide and potassium hydroxide are preferred catalysts.

The mixing of the reactants and the catalyst or the introduction of them into the reaction vessel may be accomplished by any convenient means. The nature of the products depends to some extent upon the ratio of the reactants, which can be varied over wide limits. The use of low proportions of 2,5-dihydrothiophene-1-dioxides will, in general, give products containing less sulfur than the use of high proportions of such reactant. The reaction can be carried out at subatmospheric, atmospheric or superatmospheric pressures, but preferably it is carried out in substantially oxygen-free atmosphere to prevent oxidative degradation of the polymeric polyhydric alcohol.

In the absence of a solvent the lower temperature limit is the melting point of the thiophene-1-dioxide derivative, and the upper extreme the decomposition temperature of this reactant. In the presence of a solvent, however, the lower temperature limit does not depend upon the melting point of this thiophene derivative and the reaction can be carried out even at room temperature. However, since longer periods are required at the lower temperature, it is preferred in this case also to operate just below the decomposition temperature of the thiophene derivative. In the case of 2,5-dihydrothiophene-1-dioxide, for example, the preferred temperature range is 65°-75° C.

The modified polymeric polyhydric alcohol products are ethers of the polymeric polyhydric alcohol with a 3-hydroxythiolane-1-dioxide. By the generic name "thiolane" is meant a saturated heterocyclic structure of five members, of which one is a sulfur atom and the other four carbon atoms. The ethers are of 3-hydroxythiolanes which 3-hydroxythiolanes are otherwise, i. e., apart from 3-hydroxyl hydrogen, free from hydrogen joined to the thiolane nucleus through 5th and 6th group elements, e. g., N, O, P, As, Se, Te, S, etc.

These new ethers are suitable for many applications for which it is impossible to use the original polymeric polyhydric alcohols. For example, the 1,1-dioxotetrahydrothienyl-3 ethers of cellulose can be formed, by the application of heat and pressure, into light-colored, translucent sheets and bars which are tough and strong. The organic solvent soluble ethers of polyvinyl alcohol are suitable for the preparation of lacquers and coating compositions. As such, they give tough, water-insoluble films. Solutions of these ethers are also well suited for the preparation of impregnated and coated articles of various types, including fabrics, wood, pulp, leather, etc. Unsupported sheeting can be cast from solution, or hot pressed from the ether itself. These films when plasticized are tough and remarkably elastic and rubbery. Articles prepared from polyvinyl 1,1-dioxotetrahydrothienyl-3 ethers of high sulfur content, i. e., having a small proportion of free hydroxyls as compared to the number in the original polymer, in contrast to similar items made from polyvinyl alcohol, are insoluble in water.

As many apparently widely different embodiments of this invention may be made without departing from the spirit and scope thereof, it is to be understood that the invention is not limited to the specific embodiments thereof except as defined in the appended claims.

What is claimed is:

1. An ether of a polymeric polyhydric alcohol with a 3-hydroxythiolane-1-dioxide, said 3-hydroxythiolane-1-dioxide being, apart from the 3-hydroxyl hydrogen, free from hydrogen joined to the thiolane nucleus through an element selected from the elements of the 5th and 6th groups of the periodic system.

2. An ether of a 3-hydroxythiolane-1-dioxide with a material having a cellulosic nucleus and free hydroxyls, said 3-hydroxythiolane-1-dioxide being, apart from the 3-hydroxyl hydrogen, free from hydrogen joined to the thiolane nucleus through an element selected from the elements of the 5th and 6th groups of the periodic system.

3. An ether of a 3-hydroxythiolane-1-dioxide with a polyvinyl alcohol, said 3-hydroxythiolane-1-dioxide being, apart from the 3-hydroxyl hydrogen, free from hydrogen joined to the thiolane nucleus through an element selected from the elements of the 5th and 6th groups of the periodic system.

4. An ether of a 3-hydroxythiolane-1-dioxide with an at least partially hydrolyzed vinyl acetate polymer, said 3-hydroxythiolane-1-dioxide being, apart from the 3-hydroxyl hydrogen, free from hydrogen joined to the thiolane nucleus through an element selected from the elements of the 5th and 6th groups of the periodic system.

5. An ether of a polymeric polyhydric alcohol with 3-hydroxythiolane-1-dioxide.

6. An ether of 3-hydroxythiolane-1-dioxide with a material having a cellulosic nucleus and free hydroxyls.

7. An ether of 3-hydroxythiolane-1-dioxide with a polyvinyl alcohol.

8. An ether of 3-hydroxythiolane-1-dioxide with an at least partially hydrolyzed vinyl acetate polymer.

9. Process which comprises heating, at 65-75° C. in the presence of aqueous alkali, a polymeric polyhydric alcohol with a 2,5-dihydrothiophene-1-dioxide inert to sodium at 25° C.

10. Process which comprises heating, at 65-75° C. in the presence of aqueous alkali, a material having a cellulosic nucleus and free hydroxyls with a 2,5-dihydrothiophene-1-dioxide inert to sodium at 25° C.

11. Process which comprises heating, at 65-75° C. in the presence of aqueous alkali, a polyvinyl alcohol with a 2,5-dihydrothiophene-1-dioxide inert to sodium at 25° C.

12. Process which comprises heating, at 65-75° C. in the presence of aqueous alkali, an at least partially hydrolyzed vinyl acetate polymer with a 2,5-dihydrothiophene-1-dioxide inert to sodium at 25° C.

13. Process which comprises heating, at 65-75° C. in the presence of aqueous alkali, an at least partially hydrolyzed vinyl acetate polymer with 2,5-dihydrothiophene-1-dioxide.

14. Process which comprises heating, at 65-75° C. in the presence of aqueous alkali, a polyvinyl alcohol with 2,5-dihydrothiophene-1-dioxide.

WILLIAM AUGUST HOFFMAN.
CARL WALTER MORTENSON.

Certificate of Correction

Patent No. 2,394,776. February 12, 1946.

WILLIAM AUGUST HOFFMAN ET AL.

It is hereby certified that error appears in the printed specification of the above numbered patent requiring correction as follows: Page 2, second column, line 38, Example V, for "and 2,5" read *any 2,5*; and that the said Letters Patent should be read with this correction therein that the same may conform to the record of the case in the Patent Office.

Signed and sealed this 6th day of August, A. D. 1946.

[SEAL]

LESLIE FRAZER,
*First Assistant Commissioner of Patents.*